March 27, 1951  P. P. KOLISS  2,546,824
ELECTRICAL PROTECTIVE APPARATUS
Filed Dec. 11, 1947
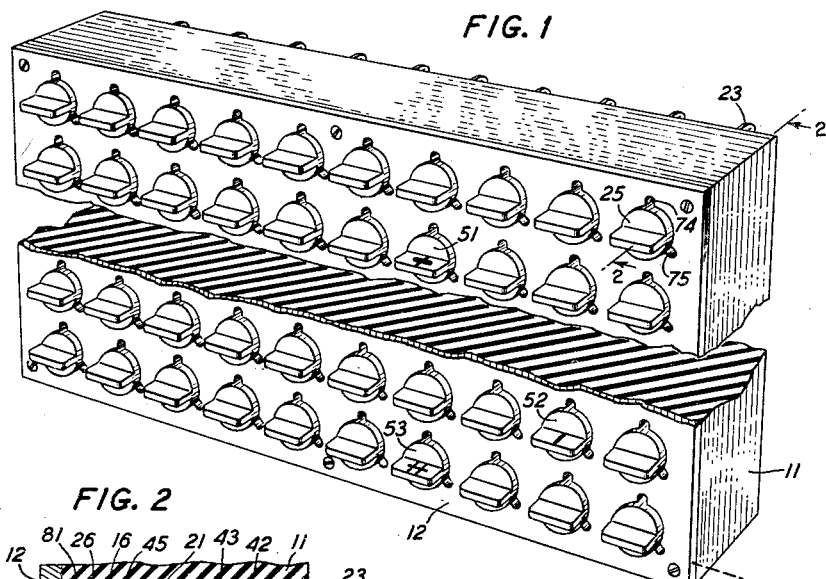
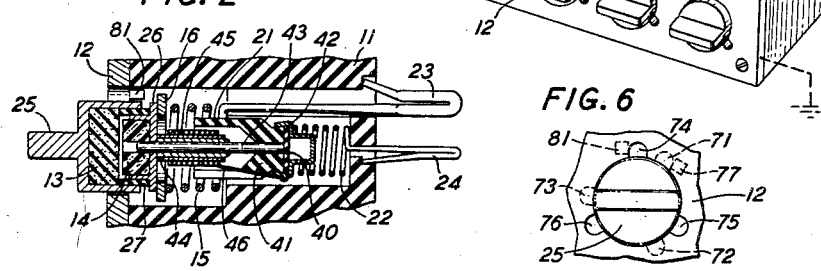
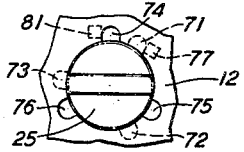
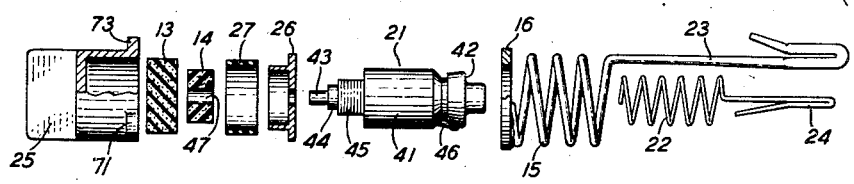
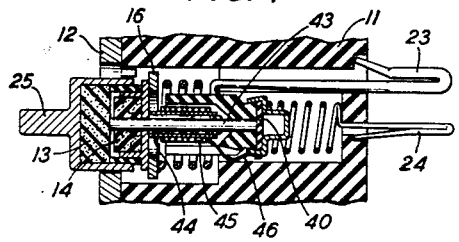
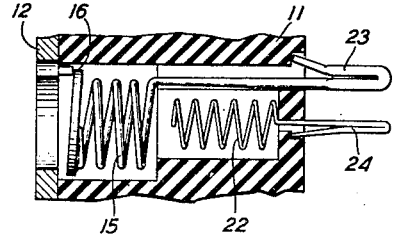
INVENTOR
P. P. KOLISS
BY *f. a. McCorkendale*
ATTORNEY Patented Mar. 27, 1951

2,546,824

UNITED STATES PATENT OFFICE 2,546,824

ELECTRICAL PROTECTIVE APPARATUS

Peter P. Koliss, West Orange, N. J., assignor to Bell Telephone Laboratories, Incorporated, New York, N. Y., a corporation of New York Application December 11, 1947, Serial No. 791,007

10 Claims. (Cl. 200—115)

This invention relates to electrical protective apparatus and particularly to a central office protector of the combined type.

In accordance with modern telephone engineering practice it is usual to provide, at the central office or other switching point, protectors for each incoming line of the so-called combined type. That is, these protectors combine protection against excessive voltages resulting, for example, from lightning, with protection against so-called "sneak" currents, that is, currents which are not strong enough to do any damage if they flow only for a short time but which might cause enough heating to char insulation and to do other damage if they were to persist. The sneak currents are produced by voltages of a relatively low magnitude as compared to the "excessive" voltages first mentioned and usually result from accidental contact between the telephone line and adjacent power lines.

The first type of protection is usually provided by so-called "open gap" protectors commonly in the form of two carbon electrodes with a small gap between, one of which electrodes is connected to ground and the other of which is connected to the incoming line. Should a high voltage be impressed on the line it will bridge across the gap to ground thereby being diverted from the sensitive equipment associated with the line.

The second type of protection is commonly provided by a device usually referred to as a "heat coil." The heat coil consists essentially of a coil of fine wire wound on a metal tube inside of which a pin is held in position by solder. Should sneak currents be impressed on the line and persist, sufficient heat will be generated to melt the solder and release the pin. A spring is usually provided which will then push the released pin forward to contact a ground plate whereby to ground the line and protect the sensitive line equipment.

For obvious reasons of efficient maintenance it is usual to group the functional protective means of each line or each pair of lines, i. e., open gap protectors and heat coils, on a common supporting means hence the term "combined type" protector. As heretofore designed, these assemblies usually include long cantilever springs of such dimensions as to accommodate the functional elements and to provide the required spring pressures for their operation. The springs extend through a clamped pile-up and serve as soldering terminals for the line connections. Patent 1,057,126, issued March 25, 1913, to Mr. A. F. Dixon, illustrates the essential features of such a combined type protector. While this and other previously used types of protector assemblies have rendered efficient and generally satisfactory service over a period of years, it has been recognized that certain undesirable features do arise in connection with their use. The type of combined protector contemplated by the present invention eliminates the undesirable features of previous designs.

Similar protective equipment is also commonly provided on electrical lines other than telephone lines, for example, telegraph lines, lines for the transmission of alarm signals and the like.

It is an object of the present invention to afford adequate protection to electrical lines in a more efficient and economical manner than has been done heretofore.

A further and more specific object of the invention is the reduction of the likelihod of circuit noise occurring in the line due to the association of the protective means with the line.

Still another specific object of the invention is the reduction of the likelihood of interference with adjacent line equipment when a given protector assembly is being tested or replaced.

A still further specific object of the invention is the reduction of personnel hazard from the standpoint of accidental contact with voltages by attendants when servicing or replacing the protector elements.

According to a feature of the present invention the functional protective elements of each line are enclosed in individual recesses in a housing. This is effective in protecting the elements against dirt accumulation as well as atmospheric corrosion whereby the possibility of circuit noise being caused by such effects is materially reduced. Further, interference with the protective elements of adjacent lines when a given protector assembly is being worked on is effectively prevented.

In accordance with a further feature of the invention a line is automatically connected to ground immediately upon the removal from the housing of the protective elements provided for that line.

In accordance with a still further feature of the invention a plate, which is likely to be contacted by the attendants when servicing or replacing protector elements, is maintained completely at ground potential at all times whereby to remove the hazard of accidental contact with voltages while working on the protectors.

In accordance with a specific embodiment of the invention, a molded plastic housing is provided for accommodation of a given number (say 200) of protectors. The housing is provided with a face plate of suitable conductive material; this plate is connected to ground whereby to provide the common ground connection for all of the protectors. The connection of the face plate to ground may be by any suitable means; for example contact with a grounded portion of the mounting frame may be utilized or a separate conductor to a ground terminal may be provided. The housing is provided with spaced, individual recesses each of which accommodates the assembled functional protective elements of a given line. The face plate is provided with a plurality of spaced apertures each of which is in registry with a respective one of the housing recesses.

The functional elements for a particular line include the protector block assembly comprising two spaced, cylindrical carbon blocks positioned within a bayonet cap unit, protector block spring and washer, and the heat coil assembly comprising the heat coil and heat coil spring. Each of the springs referred to are helical with backwardly extending arms for connection of the incoming telephone line and the central office line or other terminating line respectively.

The bayonet caps referred to act as closure members for the respective apertures in the face plate and are readily removable to permit access to the protectors from the front of the housing. Soldered connections are made at the rear of the housing while inspection, testing, etc., is done from the front of the housing.

Full understanding of the nature of the arrangement contemplated by the present invention and the method of its operation, as well as appreciation of the various desirable features thereof, may be gained from consideration of the following detailed description and the annexed drawings in which:

Fig. 1 is a front elevation view of a housing for mounting a number of combined protectors;

Fig. 2 is a sectional view taken on line 2—2 of Fig. 1 showing details of an assembly of the functional units associated with one line;

Fig. 3 is an "exploded" view in partial section of the functional units associated with one line;

Fig. 4 is a view similar to that of Fig. 2 but showing the heat coil "blown," i. e., operated;

Fig. 5 is a sectional view showing the position of the helical springs after removal of the other portions of a functional unit; and Fig. 6 is a front view of a portion of the housing showing the stops which act in cooperation with lugs carried by the bayonet cap.

Referring now to the drawings, there is shown in Fig. 1 a housing such as may be provided in a telephone central office for mounting a number, say 200, of combined protectors. The housing may comprise a molded plastic block 11 provided with a metal face plate 12. The face plate is connected to ground by suitable means; as pointed out above, personnel hazard from the standpoint of contact with voltages is removed by this expedient whereby the face plate is maintained completely at ground potential.

The plastic block is provided with a number of spaced recesses in each of which is positioned the functional protective elements for a given telephone line. The face plate 12 is provided with apertures registering respectively with the recesses in the block, these apertures normally being closed by the bayonet caps which form a part of the protector assembly.

Referring for the moment to Figs. 2 and 3, the functional protective elements associated with a given telephone line are illustrated. These elements comprise; first, the protector block assembly, including two spaced, cylindrical carbon electrode blocks 13 and 14 and protector block spring 15 and washer 16; and, second, the heat coil assembly including heat coil 21 and heat coil spring 22. Protector block spring 15 is provided with a backwardly extending arm 23 forming a terminal to which the incoming telephone line is connected; heat coil spring 22 is provided with a similar backwardly extending arm 24 forming a terminal to which the corresponding central office line is connected. The helical springs 15 and 22, when compressed as in Fig. 2, exert a pressure of the orders of 3 and 4 pounds respectively against washer 16 and heat coil 21.

When the elements are in assembled position (Fig. 2), bayonet cap 25 acts as a closure member for the aperture in face plate 12 and also as a housing for carbon electrode block 13 and as an end stop for the entire assembly. The second carbon block 14 is positioned within metallic housing 26; ceramic spacer ring 27 is positioned between the face of carbon block 13 and the base of housing member 26 and is effective to maintain a gap of the order of 3 mils between the adjacent faces of arrestor blocks 13 and 14.

Heat coil 21 comprises a cylindrical housing 41 of suitable insulating material with a metallic end cap 42. End cap 42 and metal pin 43 are anchored to housing 41, pin 43 being insulated from cap 42 by insulator 40. A metallic sleeve or tube 44 surrounds pin 43 and a winding 45 of fine wire is placed around the sleeve, one end of the winding being connected to sleeve 44, for example by soldering, and the other end being connected to end cap 42 the extreme end portion of the winding being extended as lead wire 46 for that purpose. The space between pin 43 and the inside of sleeve 44 is normally filled with low melting-point solder, the solder when in solidified state being effective to normally hold the parts of the heat coil in the position of Fig. 2 against the force of compressed spring 22. When in the assembled position of Fig. 2, the projecting end of pin is positioned in aperture 47 of carbon block 14.

It will be apparent that the various elements of the protector assembly may be easily reached for examination and testing from the front of the housing simply by removing bayonet cap 25 and, as set forth subsequently, all elements, except springs 23 and 24, may be readily removed from the front of the housing, the line being immediately grounded thereupon. As shown, spring arms 23 and 24 are provided with projecting lugs which seat in indentations in the rear of the housing whereby to hold the springs in proper position. The arrangement is such that no adjustment will be required after assembly of parts in manufacture since the number of turns and the length of helical springs 15 and 22 will automatically give the required pressure.

Under normal conditions, i. e., in the absence of disturbing voltages and currents, the protective elements will maintain the position of Fig. 2 and the circuit may be traced as follows: The normal incoming telephone currents pass through arm 23, spring 15, washer 16, base of housing 26 and through the conductive portions of heat coil 21, i. e., sleeve 44, winding 45, lead wire 46 and cap 42 to spring 22 and thence over arm 24 to the central office line. These normal currents are of insufficient voltage to traverse the gap between carbon blocks 13 and 14 to ground.

Should dangerously high voltages appear on the line, however, as a result, for example, of lightning discharges, such currents will easily bridge the gap between the carbon blocks and, consequently, instead of taking the longer path through the heat coil and associated parts, will pass directly to carbon block 13 and through bayonet cap 25 to ground on face plate 12.

It will be noticed that the arrangement of housing 26 is such that a shallow indentation prevails between the edge of block 14 and spacer 27. This is effective to prevent a build-up of carbon particles between the adjacent faces of the carbon blocks in the event of repeated arcing between the two blocks.

As set forth above, so-called "sneak" currents sometimes appear on a telephone line which, if persistent for a sufficient length of time, may cause charring of insulation and other damaging effects. With the use of the present arrangement, if such currents prevail they will cause sufficient heat in heat coil winding 45 when passing therethrough to melt the low melting-point solder which normally holds the parts of the heat coil in retracted position. Upon melting of the solder and release of pin 43 from its position in sleeve 44, the energy of compressed spring 22 will project housing 41 and pin 43 carried thereby forward to the position shown in Fig. 4 wherein the tip of the pin projects all the way through aperture 47 of carbon block 14 to engage carbon block 13 whereby to connect the incoming currents directly to ground on face plate 12 and prevent damage to the delicate apparatus associated with the central office line.

In accordance with a special feature of the present invention, should the protective elements of a given line be temporarily removed, as is often done for purposes of inspection or repair, the line is immediately grounded. The manner in which this is accomplished will be apparent from Fig. 5. As the elements are removed through the aperture in face plate 12, spring 15 will force washer 16 to "follow" until it contacts the grounded face plate thereby connecting the incoming line to ground. (The diameter of washer 16 is such that it will not pass through the aperture in face plate 12.) The biased lug provided on arm 23 and seated in the indentation provided in the rear of the housing serves to hold spring 15 in position.

The particular arrangement of the bayonet caps with respect to the apertures in face plate 12 is shown particularly in Fig. 6. When cap 25 (which is illustrative of all of the bayonet caps) is to be inserted in the associated aperture in face plate 12, it (cap 25) is so positioned that the lugs carried thereby, i. e., lugs 71, 72 and 73, are aligned with respective slots 74, 75 and 76 provided in face plate 12 whereupon the cap may be inserted and rotated clockwise to the position shown in Fig. 6. It will be observed that further clockwise rotation is prevented by engagement of lug 71 and stop 77 which is provided on the inner face of plate 12. Now, when the cap is to be removed, it is rotated in a counterclockwise direction until lug 71 is brought into engagement with stop 81 which is also provided on the inner face of plate 12; in this position lugs 71, 72 and 73 are automatically aligned with the corresponding slots 74, 75 and 76 in the face plate whereby to permit removal of the cap.

It will be apparent from the preceding description, and by again referring now to Fig. 1, that the arrangement is such that a considerable number of desirable features, not found in the arrangements previously known, are provided. Location of the protector assembly of each line in a separate individual recess in the housing results in various advantages. For example, the contact elements and other portions of the assembly are shielded against dirt accumulation and atmospheric corrosion whereby to materially reduce the possibility of circuit noise occurring from such effects. Enclosure of each protector assembly in a separate housing substantially eliminates the chance of interference with adjacent assemblies when a given unit is being serviced. Projection of springs into the aisle is eliminated together with the chance of snagging and the necessity of spring repair and displacement. The soldering operations may be conveniently performed at the rear of the housing while the bayonet cap closure members at the front of the housing may be readily removed to permit inspection and servicing of the units from the front of the housing; test fixtures may be conveniently used from the front of the housing upon removal of the bayonet caps.

The arrangement lends itself to convenient "marking" or identification of "special" lines as used, for example, in broadcasting networks. Such identification may be by use of colored plastic caps placed over the respective bayonet caps or, as shown in Fig. 1, by use of distinctive markings placed on certain of the bayonet caps themselves as shown on caps 51, 52 and 53. The colored plastic caps, when used, may serve, in addition to their identification function, as means for locking the bayonet cap in position whereby to provide additional assurance against accidental disturbance of the special lines.

A bayonet cap may be removed by a simple partial turn in the usual manner. The ease with which the protector assemblies may be inserted in the associated recess in the housing and the simple, accurate and efficient manner in which they are held in assembled position after closure of the associated bayonet cap will be apparent from the drawings. As shown, the springs, after insertion, are held in position in the recess in a simple manner by provision of the biased lugs on the projecting arms. The fact that the spring arrangement is such that the line connections are made directly thereto is a desirable one as it eliminates the spring pile-up structure of previous arrangements.

The novel housing structure lends itself to mounting edgewise to the aisle, in a manner similar to that commonly followed in central offices with the protector arrangement now used, or as a panel mounted flat against suitable frame members with all of the recesses containing the functional elements facing the aisle and all of the terminal connections in the back. The novel structure, further, lends itself to use in conjunction with a sealed chamber positioned at the rear thereof into which the incoming lead covered cable is terminated; a high insulation resistance for the incoming lines is thus assured as the wires are not exposed to atmospheric conditions at any point in the central office. The arrangement may be utilized to advantage at switching points along the line other than at a central office in which event the terminal corresponding to terminal 24 in the above description would be connected to an appropriate terminating line.

While certain specific embodiments of the invention have been selected for detailed description, the invention is not, of course, limited in its application to such embodiments. For example, the invention may be applied to electrical transmission lines other than telephone lines. The embodiments described should be taken as illustrative of the invention and not as restrictive thereof.

What is claimed is:

1. An electrical protector comprising a housing of insulating material, a face plate of conductive material for said housing, said housing having a plurality of recesses therein, a protector assembly positioned in each of the recesses, said protector assembly including a heat coil and a spaced gap protector, said spaced gap protector comprising two cylindrical blocks and means for holding said blocks in spaced relationship, said blocks and said heat coil being aligned horizontally in their respective recess along a common horizontal axis, a first and a second helical spring for exerting pressure on elements of said protector assembly, whereby to normally maintain the elements of the assembly in compactly assembled relationship, said helical springs also being aligned along said common horizontal axis with the turns of said first spring coextensive with a portion of said heat coil, means for connecting one element of said spaced gap protector to said face plate, a terminal for connection of an incoming line, a terminal for connection of a central office line, means including said first helical spring for connecting the other element of said spaced gap protector and one terminal of said heat coil to said incoming line terminal, and means including said second helical spring for connecting the other terminal of said heat coil to said central office line terminal.

2. An electrical protector comprising a housing of insulating material, a face plate of conductive material for said housing, said housing having a plurality of recesses therein, a protector assembly positioned in each of the recesses, said protector assembly including a heat coil and a spaced gap protector, said spaced gap protector comprising two cylindrical blocks and means for holding said blocks in spaced relationship, said blocks and said heat coil being aligned horizontally in their respective recess along a common horizontal axis, a first and a second helical spring for exerting pressure on elements of said protector assembly, whereby to normally maintain the elements of the assembly in compactly assembled relationship, said helical springs also being aligned along said common horizontal axis with the turns of said first spring coextensive with a portion of said heat coil, means for connecting one element of said spaced gap protector to said face plate, an incoming line terminal, a central office line terminal, means including said first helical spring for connecting the other element of said spaced gap protector and one terminal of said heat coil to said incoming line terminal, means including said second helical spring for connecting the other terminal of said heat coil to said central office line terminal, and means, effective upon removal of the spaced gap protector elements of said protector assembly from the recess, for connecting the incoming line directly to said face plate.

3. An assembly of protectors of the combined type for connection to a plurality of electrical lines comprising a housing of insulation material, said housing having a plurality of individual spaced recesses therein passing from the front surface to the rear surface thereof, a face plate for said housing of conductive material having a plurality of apertures therein registering respectively with the recesses in the housing, a protector assembly positioned in each of the recesses for association with the respective lines, each of said protector assemblies comprising an open-gap protector for protection against excessive voltages and a heat coil for protection against sneak currents, each of said open gap protectors comprising two cylindrical carbon blocks and means for holding said blocks in spaced relationship, said open gap protector and said heat coil being aligned horizontally in their respective recess along a common horizontal axis, a first and a second helical spring for exerting pressure on elements of said protector assembly whereby to normally maintain the elements of the assembly in compactly assembled relationship, said helical springs also being aligned along said common horizontal axis with the turns of said first spring coextensive with a portion of said heat coil, means including said first spring for connecting an incoming line to the protector assembly, means including said second spring for connecting the associated office line to the protector assembly, and means removably positioned in the associated aperture in the face plate for closing said aperture, said last-mentioned means serving also as a housing for the major portion of said open gap protector and as a means for electrically connecting one block of said open gap protector to said face plate.

4. An assembly of electrical protectors of the combined type for protection of a plurality of individual lines at a terminating point comprising a housing of molded plastic insulation material, said housing having a plurality of individual, spaced recesses therein passing from the front face of said housing to the rear face thereof, a face plate of conductive material mounted on the front face of said housing having a plurality of apertures therein registering respectively with the recesses in said housing, removable means for normally closing said apertures, an assembly of the functional protector elements for a given line mounted in each of said recesses, each of said functional protector element assemblies comprising an open gap protector and a heat coil, said open gap protector comprising two carbon blocks and means for holding said blocks in spaced relationship whereby to maintain a gap of the order of 3 mils between the two adjacent faces thereof, said open gap protector and said heat coil being aligned horizontally in their respective recess along a common horizontal axis, a first helical spring and a second helical spring for exerting pressure on elements of said protector assembly whereby to normally maintain the elements of the assembly in compactly assembled relationship, said helical springs also being aligned along said common horizontal axis with the turns of said first spring coextensive with a portion of said heat coil, means to electrically connect one end of said first spring to one of said carbon blocks and to one terminal of said heat coil, said first spring having an extension arm thereon projecting from the rear of said housing, means for connecting an incoming line directly to said extension arm, and means for connecting the other of said carbon blocks to said face plate, said second spring also having an extension arm thereon projecting from the rear of said housing, means to connect one end of said second spring to the other terminal of said heat coil, and means for connecting a terminating line directly to said extension arm of said second spring.

5. An assembly of electrical protectors of the combined type for protection of a plurality of individual lines at a terminating point comprising a housing of molded plastic insulation material, said housing having a plurality of individual, spaced recesses therein passing from the front face of said housing to the rear face thereof, a face plate of conductive material mounted on the front face of said housing having a plurality of apertures therein registering respectively with the recesses in said housing, removable means for normally closing said apertures, an assembly of the functional protector elements for a given line mounted in each of said recesses, each of said functional protector element assemblies comprising an open gap protector and a heat coil, said open gap protector comprising two carbon blocks and means for holding said blocks in spaced relationship whereby to maintain a gap of the order of 3 mils between the two adjacent faces thereof, said open gap protector and said heat coil being aligned horizontally in their respective recess along a common horizontal axis, a first helical spring, means to electrically connect one end of said first spring to one of said carbon blocks and to one terminal of said heat coil, said first spring having an extension arm thereon projecting from the rear of said housing, means for connecting an incoming line directly to said extension arm, said removable closing means also serving as means for connecting the other of said carbon blocks to said face plate and as a housing for said other carbon block, a second helical spring, said second spring also having an extension arm thereon projecting from the rear of said housing, means to connect one end of said second spring to the other terminal of said heat coil, and means for connecting a terminating line directly to said extension arm of said second spring, said helical springs also being aligned along said common horizontal axis with the turns of said first spring coextensive with a portion of said heat coil, said springs serving to exert mechanical pressure against the protector assembly whereby to tend to move said assembly forward in said recess towards said face plate and against the restraining action of said removable closing means thereby normally maintaining the elements of the assembly in compactly assembled relationship.

6. An assembly of electrical protectors of the combined type for protection of a plurality of individual lines at a terminating point comprising a housing of molded plastic insulation material, said housing having a plurality of individual, spaced recesses therein passing from the front face of said housing to the rear face thereof, a face plate of conductive material mounted on the front face of said housing having a plurality of apertures therein registering respectively with the recesses in said housing, removable means for normally closing said apertures, an assembly of the functional protector elements for a given line mounted in each of said recesses, each of said functional protector element assemblies comprising an open gap protector and a heat coil, said open gap protector comprising two carbon blocks and means for holding said blocks in spaced relationship whereby to maintain a gap of the order of 3 mils between the two adjacent faces thereof, said open gap protector and said heat coil being aligned horizontally in their respective recess along a common horizontal axis, a first helical spring and a second helical spring for exerting pressure on elements of said protector assembly whereby to normally maintain the elements of the assembly in compactly assembled relationship, said helical springs also being aligned along said common horizontal axis with the turns of said first spring coextensive with a portion of said heat coil, means to electrically connect one end of said first spring to one of said carbon blocks and to one terminal of said heat coil, said first spring having an extension arm thereon projecting from the rear of said housing, means for connecting an incoming line directly to said extension arm, and means for connecting the other of said carbon blocks to said face plate, said second spring also having an extension arm thereon projecting from the rear of said housing, means to connect one end of said second spring to the other terminal of said heat coil, and means for connecting a terminating line directly to said extension arm of said second spring, each of said extension arms having a biased lug thereon adapted to be seated in respective indentations provided in the rear of said housing whereby to maintain said springs in assembled position.

7. An assembly of electrical protectors of the combined type for protection of a plurality of lines at a central switching point comprising a housing of molded plastic insulation material, said housing having a plurality of individual, spaced recesses therein passing from the front face of said housing to the rear face thereof, a face plate of conductive material mounted on the front face of said housing having a plurality of apertures therein registering respectively with the recesses in said housing, removable means for normally closing said apertures, an assembly of the functional protector elements for a given line mounted in each of said recesses, each of said functional protector element assemblies comprising an open gap protector and a heat coil, said open gap protector comprising two cylindrical carbon block electrodes, means for holding said electrode blocks in spaced relationship whereby to maintain a gap of the order of 3 mils between the two adjacent faces thereof and means for providing an auxiliary gap between said electrodes in the form of a shallow circular recess surrounding the adjacent face of one electrode, said open gap protector and said heat coil being aligned horizontally in their respective recess along a common horizontal axis, a first and a second helical spring for exerting pressure on elements of said protector assembly whereby to normally maintain the elements of the assembly in compactly assembled relationship, said helical springs also being aligned along said common horizontal axis with the turns of said first spring coextensive with a portion of said heat coil, means including said first spring to connect an incoming line to one of said carbon block electrodes and to one side of said heat coil, means to connect the other of said carbon block electrodes to said face plate, and means including said second spring for connecting an associated terminating line to the other side of said heat coil.

8. A housing of insulating material, a face plate of conductive material for said housing, said housing having an aperture therein extending from the front face thereof to a point just short of the rear face thereof, a unitary protector assembly positioned in said aperture comprising a heat coil and a spaced gap protector, a shoulder in said aperture, a plurality of helical springs for holding the heat coil and the spaced gap protector in assembled position within the aperture, said face plate having an aperture therein registering with the front end of the aperture in the housing, said springs being insertable into the aperture through the face plate aperture and being restricted in their movement toward the rear of the aperture by contact with said shoulder and the rear wall of the aperture respectively, removable means for closing the aperture in said face plate, spaced apertures through the rear wall of said first aperture, and an extension arm on each of said springs, said extension arms passing through the apertures in said rear wall and serving both as positioning means for said springs and as means for electrically connecting external lines thereto.

9. A housing of insulation material having an open-faced recess therein, a multielement protector assembly positioned in the recess, a plurality of helical springs positioned in the recess and insertable therein through the open face thereof, means including the rear wall of the recess for restricting the movement of said springs toward the rear of the recess, removable means for closing the open face of the recess, said closing means when in closing position being effective to bias the protector assembly towards the rear of the recess against the yielding restraint of said springs and to hold the assembly in compact relationship with both springs in partially compressed condition, the rear wall of the recess having spaced apertures therethrough, and extension arms on said springs, said arms extending through the apertures and serving both as positioning means for said springs and as means for electrically connecting external circuits thereto.

10. An assembly of electrical protectors of the combined type for protection of a plurality of individual lines at a terminating point comprising a housing of insulation material, said housing having a plurality of individual, spaced recesses therein, an assembly of the functional protector elements for a given line mounted in each of said recesses, each of said protector element assemblies comprising a cap, an open gap protector including a pair of spaced conductive blocks, and a heat coil, a face plate of conductive material mounted on the front face of said housing, means including a coiled spring for connecting an incoming line to one side of said heat coil and one side of said open gap protector, means for connecting the other side of said open gap protector to said face plate, and means for connecting the other side of said heat coil to a terminating line, the structure and arrangement of the elements of a protector element assembly being such as to permit a compact assembled mounting of such elements in their respective recess with all elements substantially symmetrical with respect to the horizontal axis of said recess and with said blocks in telescopic relationship with said cap and with said heat coil within said coiled spring.

PETER P. KOLISS.

REFERENCES CITED

The following references are of record in the file of this patent:

UNITED STATES PATENTS

| Number | Name | Date |
|---|---|---|
| 805,154 | Procunier | Nov. 21, 1904 |
| 1,974,257 | Brandt | Sept. 18, 1934 |
| 2,136,858 | Michel | Nov. 15, 1938 |
| 2,417,420 | Knapp, Jr. | Mar. 18, 1947 |

FOREIGN PATENTS

| Number | Country | Date |
|---|---|---|
| 35,025 | Netherlands | Mar. 15, 1935 |
| 144,122 | Switzerland | Mar. 2, 1931 |